(12) United States Patent
Ge

(10) Patent No.: US 6,778,281 B2
(45) Date of Patent: Aug. 17, 2004

(54) PHASE SHIFT FRINGE ANALYSIS METHOD AND APPARATUS USING THE SAME

(75) Inventor: Zongtao Ge, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 411 days.

(21) Appl. No.: 10/051,169

(22) Filed: Jan. 22, 2002

(65) Prior Publication Data

US 2002/0135777 A1 Sep. 26, 2002

(30) Foreign Application Priority Data

Jan. 31, 2001 (JP) ........................................ 2001-023200
Dec. 28, 2001 (JP) ........................................ 2001-399179

(51) Int. Cl.$^7$ ................................................ G01B 9/02
(52) U.S. Cl. ....................... 356/511; 356/508; 356/512
(58) Field of Search ............................. 356/496, 508, 356/510, 511, 512, 513, 514; 382/280

(56) References Cited

U.S. PATENT DOCUMENTS 5,734,471 A * 3/1998 Nakata ........................ 356/508
6,532,073 B2 * 3/2003 Ge .............................. 356/512
6,621,579 B2 * 9/2003 Ge .............................. 356/512
6,693,715 B2 * 2/2004 Ge .............................. 356/512

OTHER PUBLICATIONS

Mitsuo Takeda, "Subfringe Interferometry Fundamentals", *Kogaku,* Feb. 1984, pp. 55–65, vol. 13, No. 1, Japan.
Katherine Creath, "Phase-Measurement Interferometry Techniques", *Progress in Optics,* E. Wolf, Editor, 1988, pp. 349–393, vol. XXVI, Elsevier Science Publishers B.V., New York, U.S.A.

* cited by examiner

*Primary Examiner*—Samuel A. Turner
*Assistant Examiner*—Michael A. Lyons
(74) *Attorney, Agent, or Firm*—Snider & Associates; Ronald R. Snider

(57) ABSTRACT

A phase shift fringe image analysis method comprises the steps of shifting an object to be observed and a reference relative to each other by using a phase shift device, obtaining fringe image data at three or more phase shift positions having a given phase gap therebetween, and determining a phase of the object by analyzing thus obtained plurality of fringe image data items. The positional data of at least three phase positions are specified, and the whole or part of the fringe image data on which carrier fringes at these phase positions are superposed is subjected to a predetermined arithmetic operation so as to carry out a phase analysis and determine the phase of the object.

10 Claims, 5 Drawing Sheets

PHASE SHIFT FRINGE ANALYSIS METHOD AND APPARATUS USING THE SAME

RELATED APPLICATIONS

This application claims the priorities of Japanese Patent Application No. 2001-23200 filed on Jan. 31, 2001 and Japanese Patent Application No. 2001-399179 filed on Dec. 28, 2001, which are incorporated herein by reference.

BACKGROUND OF THE INVENTION

1. Field of the Invention

The present invention relates to a phase shift fringe analysis method using Fourier transform when analyzing a fringe image by using a phase shift method, and an apparatus using the same. In particular, the present invention relates to a phase shift fringe analysis method comprising the steps of obtaining image information of interference fringes and the like while shifting a phase by using a phase shift device such as PZT (piezoelectric device), and analyzing thus obtained plurality of image data items having a fringe pattern of interference fringes and the like, thereby attaining highly accurate phase information of an object to be observed; and an apparatus using the same.

2. Description of the Prior Art

While light-wave interference method, for example, has conventionally been known as important means concerning precise measurement of object surfaces, there have recently been urgent needs for developing an interferometry technique (sub-fringe interferometry) for reading out information from a fraction of a single interference fringe (one fringe) or less from the necessity to measure a surface or wavefront aberration of ¹⁄₁₀ wavelength or higher.

An example of typical techniques widely in practice as such sub-fringe interferometry is a phase shift fringe analysis method (also known as fringe scanning method or phase scanning method) disclosed in "PHASE-MEASUREMENT INTERFEROMETRY TECHNIQUES," *PROGRESS IN OPTICS*, VOL. XXVI (1988), pp. 349–393.

In the phase shift method, a phase shift device such as a PZT (piezoelectric) device is used for phase-shifting the relative relationship between an object to be observed and a reference, interference fringe data is captured each time a predetermined step amount shifts, so as to measure the interference fringe intensity of each point of the object surface, and the phase of each point of the surface is determined by using the results of measurement.

In the case of a 4-step phase shift method, for example, respective interference fringe intensities $I_1$, $I_2$, $I_3$, and $I_4$ at individual phase shift steps are expressed as follows:

$$I_1(x, y) = I_0(x, y)\{1+\gamma(x, y)\cos[\phi(x, y)]\}$$
$$I_2(x, y) = I_0(x, y)\{1+\gamma(x, y)\cos[\phi(x, y)+\pi/2]\}$$
$$I_3(x, y) = I_0(x, y)\{1+\gamma(x, y)\cos[\phi(x, y)+\pi]\}$$
$$I_4(x, y) = I_0(x, y)\{1+\gamma(x, y)\cos[\phi(x, y)+3\pi/2]\}$$

(2)

where x and y are coordinates;

$\phi(x, y)$ is a phase;

$I_0(x, y)$ is the average optical intensity at each point; and $\gamma(x, y)$ is the modulation of interference fringes.

From these expressions, the phase $\phi(x, y)$ can be determined as $$\phi(x, y) = \tan^{-1}\frac{I_4(x, y) - I_2(x, y)}{I_1(x, y) - I_3(x, y)}. \quad (3)$$

Though the phase shift method enables measurement with a very high accuracy if a predetermined step amount can shift accurately, it has been problematic in terms of measurement errors occurring due to errors in step amount and in that it is likely to be affected by disturbances during measurement since it necessitates a plurality of interference fringe image data items.

As a sub-fringe interferometry technique other than the phase shift method, attention has been focused on one using a Fourier transform method, for example, as disclosed in "Basics of Sub-fringe Interferometry," *Kogaku*, Vol. 13, No. 1 (February 1984), pp. 55 to 65.

The Fourier transform fringe analysis method is a technique in which a carrier frequency (caused by a relative tilt between an object surface to be observed and a reference surface) is introduced, whereby the phase of the object can be determined with a high accuracy from a single fringe image. When a carrier frequency is introduced without the initial phase of the object being taken into consideration, the interference fringe intensity $i(x, y)$ is represented by the following expression (4):

$$i(x, y) = a(x, y) + b(x, y)\cos[2\pi f_x x + 2\pi f_y y + \phi(x, y)] \quad (4)$$

where $a(x, y)$ is the background of interference fringes;

$b(x, y)$ is the visibility of fringes;

$\phi(x, y)$ is the phase of the object; and $f_x$ and $f_y$ are respective carrier frequencies in x and y directions expressed by:

$$f_x = \frac{2 \cdot \tan\theta_x}{\lambda}, \quad f_y = \frac{2 \cdot \tan\theta_y}{\lambda}$$

where $\lambda$ is the wavelength of light, and $\theta_x$ and $\theta_y$ are respective inclinations of the object surface in x and y directions.

The above-mentioned expression (4) can be deformed as the following expression (5):

$$i(x, y) = a(x, y) + c(x, y)\exp[i(2\pi f_x x + 2\pi f_y y)] + c^*(x, y)\exp[-i(2\pi f_x x + 2\pi f_y y)] \quad (5)$$

where $c(x, y)$ is the complex amplitude of interference fringes, and $c^*(x, y)$ is the complex conjugate of $c(x, y)$.

Here, $c(x, y)$ is represented as the following expression (6):

$$c(x, y) = \frac{b(x, y)\exp[i\phi(x, y)]}{2}. \quad (6)$$

When the above-mentioned expression (5) is Fourier-transformed, the following expression (7) is obtained:

$$I(\eta, \zeta) = A(\eta, \zeta) + C(\eta - f_x, \zeta - f_y) + C^*(\eta + f_x, \zeta + f_y) \quad (7)$$

where $A(\eta, \zeta)$ is the Fourier transform of $a(x, y)$;

$C(\eta - f_x, \zeta - f_y)$ is the Fourier transform of $c(x,y)\exp[i(2\pi f_x x + 2\pi f_y y)]$; and $C^*(\eta + f_x, \zeta + f_y)$ is the Fourier transform of $c^*(x,y)\exp[-i(2\pi f_x x + 2\pi f_y y)]$.

Subsequently, $C(\eta-f_x, \zeta-f_y)$ is taken out by filtering, and the peak of a spectrum positioned at coordinates $(f_x, f_y)$ is moved to the origin of a frequency coordinate system (also known as a Fourier spectrum coordinate system; see FIG. 8), so as to eliminate the carrier frequency. Then, inverse Fourier transform is carried out, so as to determine c(x, y), and the wrapped phase $\phi$ (x, y) is determined by the following expression (8):

$$\phi(x, y) = \tan^{-1} \frac{\text{Im}[c(x, y)]}{\text{Re}[c(x, y)]} \quad (8)$$

where Im[c(x, y)] is the imaginary part of c(x, y), and Re[c(x, y)] is the real part of c(x, y).

Finally, unwrapping is carried out, so as to determine the phase $\Phi$(x, y) of the object to be measured.

In the Fourier transform analysis method explained in the foregoing, the fringe image data modulated by the carrier frequency is subjected to Fourier transform as stated above.

In general, as mentioned above, the phase shift method captures the brightness of an image while imparting a phase difference between object light of an interferometer and reference light by a phase angle which is an integral fraction $2\pi$ and analyzes thus captured brightness, thereby theoretically enabling a highly accurate phase analysis.

For securing highly accurate phase analysis, however, it is necessary that the relative relationship between a sample and a reference be displaced at a high accuracy by a predetermined phase amount (very short distance). When the phase shift method is carried out by physically moving a reference surface or the like by using a PZT (piezoelectric device), for example, it is necessary that the amount of displacement of the PZT (piezoelectric) device be controlled highly accurately. However, the displacement error of the phase shift device or the tilt error of the object surface is hard to eliminate completely, whereby controlling the amount of phase shift or tilt with a high accuracy is a difficult task in practice.

From such a viewpoint, the assignee has obtained an excellent result with a technique for detecting the above-mentioned error resulting from the phase shift device and correcting the fringe image analysis according to the detection value upon carrying out the analysis. In this technique, the fringe image data obtained by use of the phase shift method is subjected to Fourier transform, the carrier frequency and complex amplitude caused by fluctuations in wavefront occurring between an object to be observed and a reference, and the amounts of displacement and tilt of phase shift are detected according to the carrier frequency and complex amplitude, so as to correct results determined by the phase shift method, whereby influences caused by errors in the amount of tilt/displacement of the phase shift amount are eliminated.

The above-mentioned technique proposed by the assignee is a quite effective technique in that it can easily alleviate influences of errors caused by the phase shift device without using an expensive phase shift device. However, since calculations for correcting the amount of error from a predetermined step amount (e.g., 90 degrees in the case of 4-bucket (step) method), the time required for fringe analysis becomes longer. Also, even in the case where 3-bucket method is theoretically sufficient when no shift error exists in the phase shift device, it is necessary to use 4-bucket method or 5-bucket method from the viewpoint of accuracy, which may also hinder the time required for fringe analysis from becoming shorter.

In view of the foregoing circumstances, it is an object of the present invention to provide a phase shift fringe image analysis method which can eliminate influences caused by errors in the amount of displacement of phase shift and/or relative tilt amounts between the object and the reference without making the apparatus configuration complicated and expensive when analyzing fringe image data obtained by using a phase shift method, whereby the fringe analysis can be carried out rapidly and favorably; and an apparatus using the same.

The present invention provides a phase shift fringe image analysis method comprising the steps of shifting an object to be observed and a reference relative to each other by using a phase shift device, obtaining fringe image data at a plurality of phase shift positions, and determining a phase of the object by analyzing thus obtained plurality of fringe image data items;

wherein the plurality of phase shift positions are at least three phase positions having a given phase gap therebetween; and wherein positional data of the above-mentioned at least three phase positions are specified, and the whole or part of the fringe image data on which carrier fringes at these phase positions are superposed is subjected to a predetermined arithmetic operation so as to carry out a phase analysis and determine the phase of the object.

The positional data of the above-mentioned at least three phase positions may be determined by a Fourier transform fringe analysis method.

The predetermined arithmetic operation may be carried out in view of data concerning relative tilt between the object and the reference at the above-mentioned at least three phase positions.

The data concerning relative tilt between the object and the reference may be determined from a difference in frequency of the carrier fringes.

The data concerning relative tilt between the object and the reference may be determined from a difference in phase of the object.

The number of phase shift positions for determining the fringe image data may be 3, and the phase of the object may be represented by the following conditional expression (1):

$$\phi(x, y) = \arctan \cos\delta_3 - (1+p)\cos\delta_2 + \frac{p\cos\delta_1}{\sin\delta_3 - (1+p)\sin\delta_2 + p\sin\delta_1}, \quad (3)$$

where $$p = \frac{i_3 - i_2}{i_2 - i_1} = \frac{\cos[\phi(x, y) + \delta_3] - \cos[\phi(x, y) + \delta_2]}{\cos[\phi(x, y) + \delta_2] - \cos[\phi(x, y) + \delta_1]}, \text{ and}$$

$$i_m(x, y, \xi_m) = a(x, y) + b(x, y)\cos[2\pi f_{xm}x + 2\pi f_{ym}y + \phi(x, y) + \xi_m]$$

$$= a(x, y) + b(x, y)\cos[\phi(x, y) + \delta_m]$$

where a(x, y) is the background of interference fringes;

b(x, y) is the visibility of fringes;

$\phi$ (x, y) is the phase of the object; and $\delta_m$ is the phase shift amount of the phase shift device expressed by:

$$\delta_m = 2\pi f_{xm}x + 2\pi f_{ym}y + \xi_m$$

where $\xi_m$ is the phase of the phase shift device (not including the part involved with the tilt of the phase shift device); and $f_{xm}$ and $f_{ym}$ are the carrier frequencies (including the part of the error in inclination of the phase shift device) after the m-th phase shift expressed by:

$$\xi_m = 2\pi \frac{z_m}{\lambda}, \quad f_{xm} = \frac{2 \cdot \tan\theta_{xm}}{\lambda}, \quad f_{ym} = \frac{2 \cdot \tan\theta_{ym}}{\lambda}$$

where $\lambda$ is the wavelength of light;

$\theta_{xm}$ and $\theta_{ym}$ are respective inclinations of the object surface upon the m-th phase shift in x and y directions; and $z_m$ is the amount of displacement of the phase shift device at the m-th shift position (not including the part involved with the tilt of the phase shift device).

The phase shift fringe analysis method in accordance with the present invention may comprise the steps of determining a complex amplitude of a fringe image by the Fourier transform fringe analysis method, and obtaining the above-mentioned at least three phase positions according to thus determined complex amplitude.

The phase shift fringe analysis method in accordance with the present invention may comprise the steps of selecting a plurality of sets of at least three local fringe image data items corresponding to each other from fringe image data at the above-mentioned at least three phase shift positions, obtaining positional data of the above-mentioned at least three phase positions concerning each set according to the fringe image data of respective set, and averaging positional data of phase positions by a number corresponding to the number of the sets, so as to determine final positional data of the above-mentioned at least three phase positions.

The fringe image may be an interference fringe image.

The present invention provides a phase shift fringe analysis apparatus for shifting an object to be observed and a reference relative to each other by using a phase shift device, obtaining fringe image data at a plurality of phase shift positions, and analyzing thus obtained plurality of fringe image data items so as to determine a phase of the object;

wherein the plurality of phase shift positions are at least three phase positions having a given phase gap therebetween; and wherein the apparatus comprises data acquiring means for obtaining positional data of the at least three phase positions, and phase analysis means for carrying out a phase analysis by subjecting the whole or part of the fringe image data on which carrier fringes at these phase positions are superposed to a predetermined arithmetic operation.

DESCRIPTION OF THE PREFERRED EMBODIMENTS

In the following, the phase shift fringe analysis method in accordance with an embodiment of the present invention will be explained with reference to the drawings.

This method is one comprising the steps of shifting an object to be observed and a reference relative to each other by using a phase shift device, obtaining fringe image data at a plurality of phase shift positions, and determining a phase of the object by analyzing thus obtained plurality of fringe image data items. The plurality of phase shift positions are at least three phase positions having a given phase gap therebetween, positional data of the above-mentioned at least three phase positions are specified, and the whole or part of the fringe image data on which carrier fringes at these phase positions are superposed is subjected to a predetermined arithmetic operation so as to carry out a phase analysis and determine the phase of the object. This embodiment relates to a case where it is applied to an interference fringe analysis which is a typical example of fringe image analysis.

Though the phase position is not required to be a specific value in this phase shift fringe analysis method, it is necessary that, after the fringe image data is obtained, positional data of each phase position where the fringe image data was obtained be specified.

Figure 4:
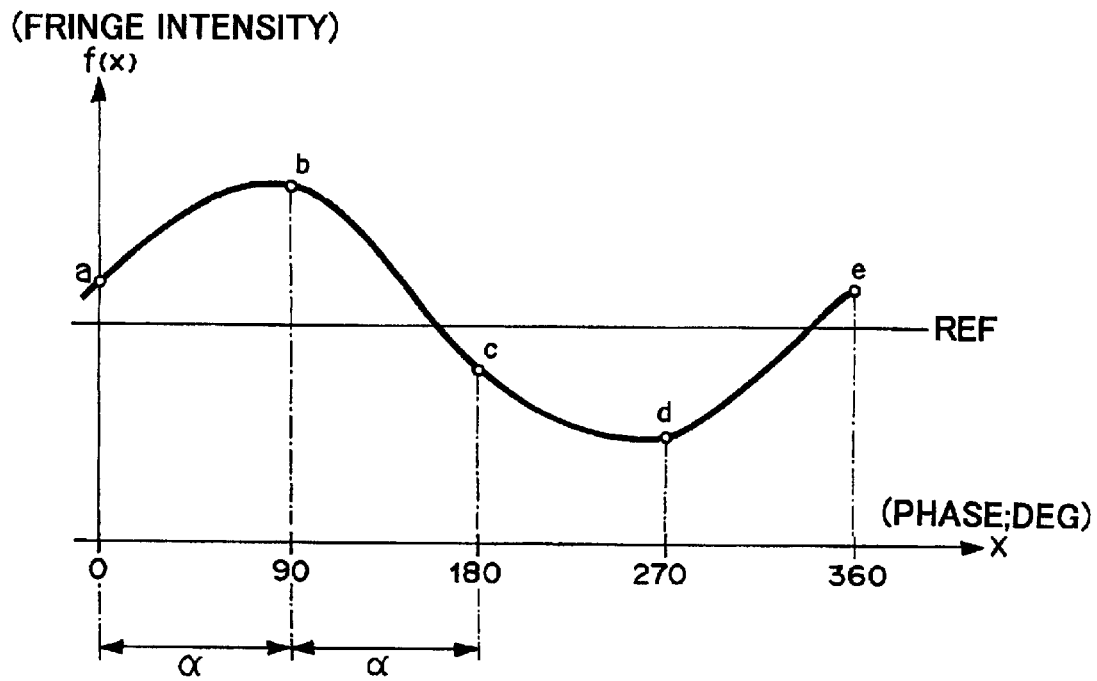
FIG. 4 is a graph corresponding to FIG. 3 in a conventional technique.

Namely, in the conventional phase shift fringe analysis method, respective fringe intensity values are plotted at predetermined phase shift positions (0°, 90°, 180°, 270°, and 360° here) arranged at equally-spaced intervals (at intervals of a α=90° here) as shown in FIG. 4, and a sine wave function f(x) passing near these points (a, b, c, d, e) is determined. According to such a conventional technique, the phase shift positions are required to be set at predetermined positions with a high accuracy, whereby processing for correcting them to values at these predetermined positions and the like are necessary in practice.

Figure 3:
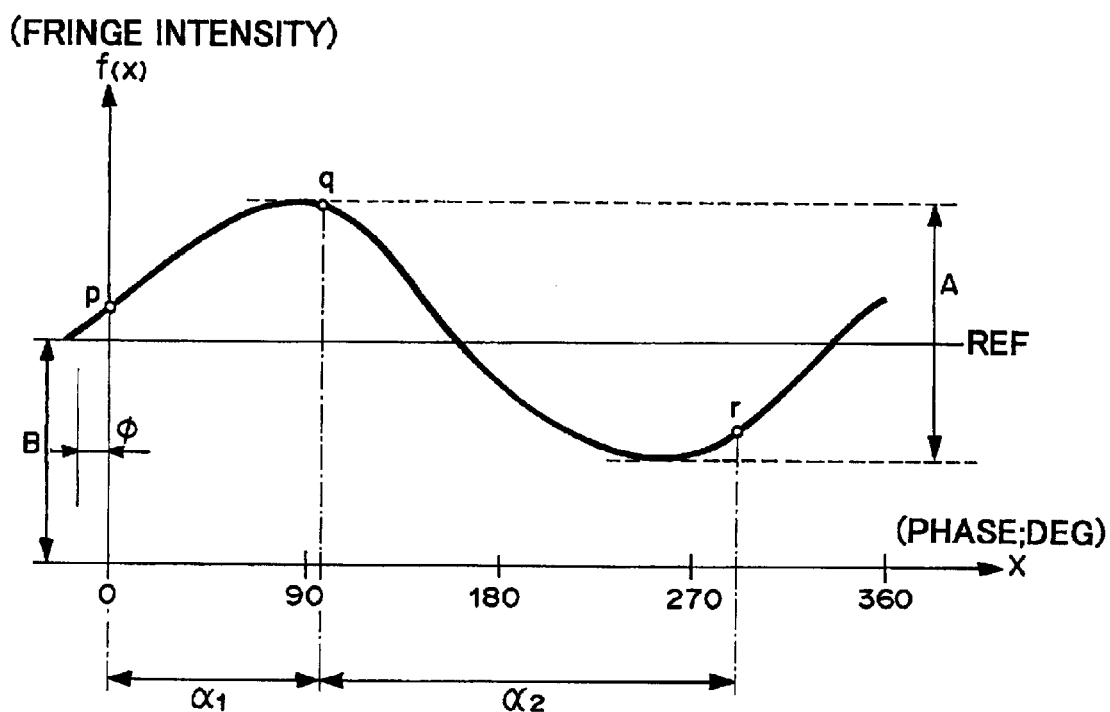
FIG. 3 is a graph for explaining characteristic features of the method in accordance with the present invention.

In the phase shift fringe analysis method in accordance with this embodiment, by contrast, respective fringe intensity values of at least three phase shift positions having a given phase gap ($\alpha_1, \alpha_2$) are plotted as shown in FIG. 3, and a sine wave function f(x) passing near points (p, q, r) is obtained by using a computing equation which will be explained later. Here, assuming that $$f(x) = A\cos(x+\phi) + B,$$

the number of unknowns is 3, i.e., A, $\phi$, and B. Therefore, the function f(x) can be specified when positional data in at least three phase shift positions and their corresponding fringe intensities are known.

An outline of this embodiment will now be explained with reference to the flowchart of FIG. 1, before explaining it separately in terms of specifying positional data at individual phase positions and calculating the phase of the object to be observed by using thus specified positional data.

Figure 1:
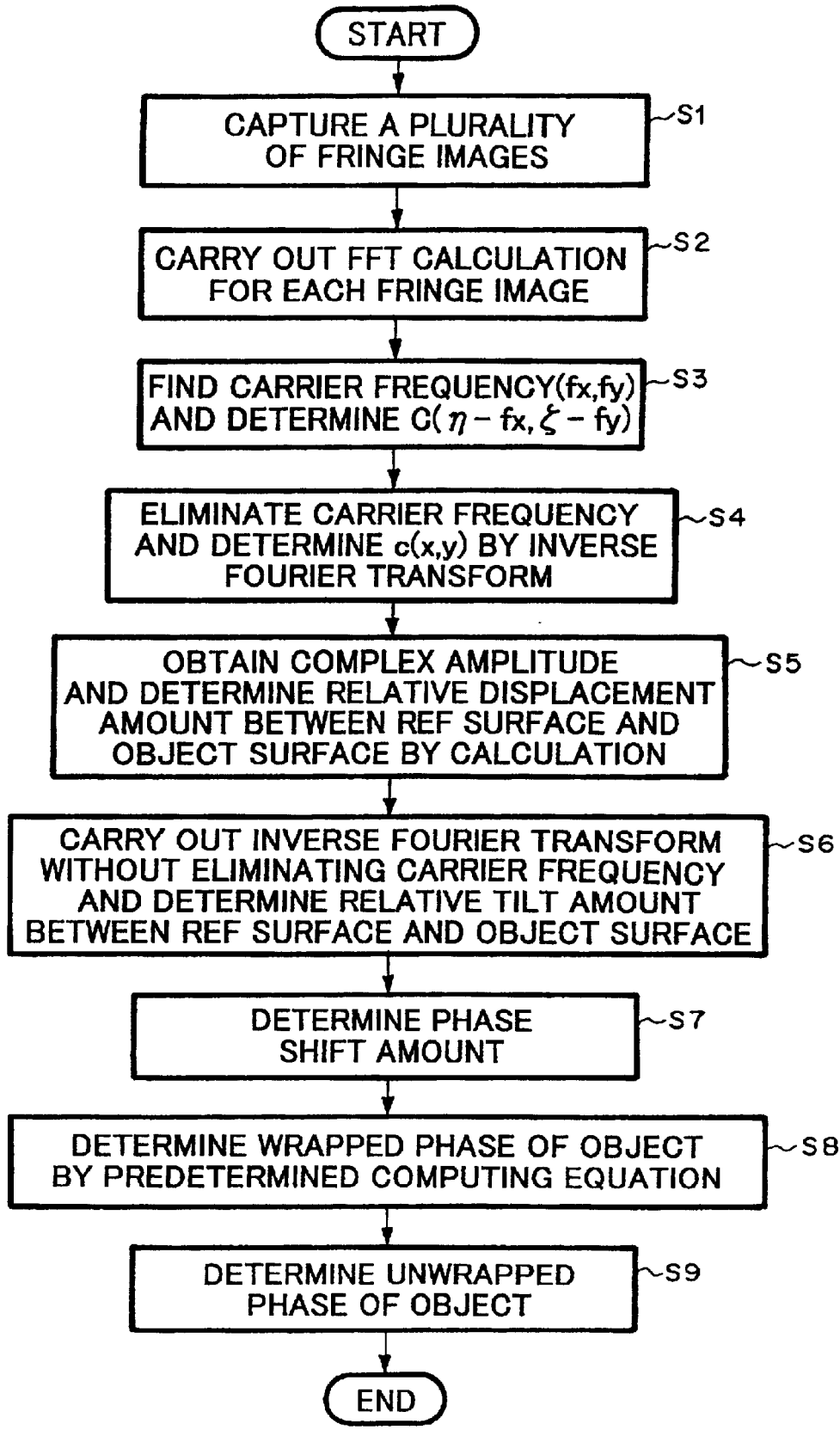
FIG. 1 is a flowchart for explaining the method in accordance with an embodiment of the present invention.

In this embodiment, as shown in FIG. 1, interference fringe images carrying form information of an object to be observed on which spatial carrier fringes are superposed by imparting a predetermined relative inclination between a reference surface and an object surface is captured by a CCD image pickup camera at a plurality of phase shift positions while driving a phase shift device (S1). Subsequently, each of thus obtained interference fringe image data is subjected to Fourier transform (S2), and a spatial carrier frequency ($f_x$, $f_y$) is found, whereby $C(\eta - f_x, \zeta - f_y)$ is determined (S3). The spatial carrier frequency ($f_x$, $f_y$) at that time corresponds to the total tilt formed by the predetermined inclination imparted beforehand between the reference surface and the object surface and the error in inclination generated upon driving the phase shift device.

Figure 8:
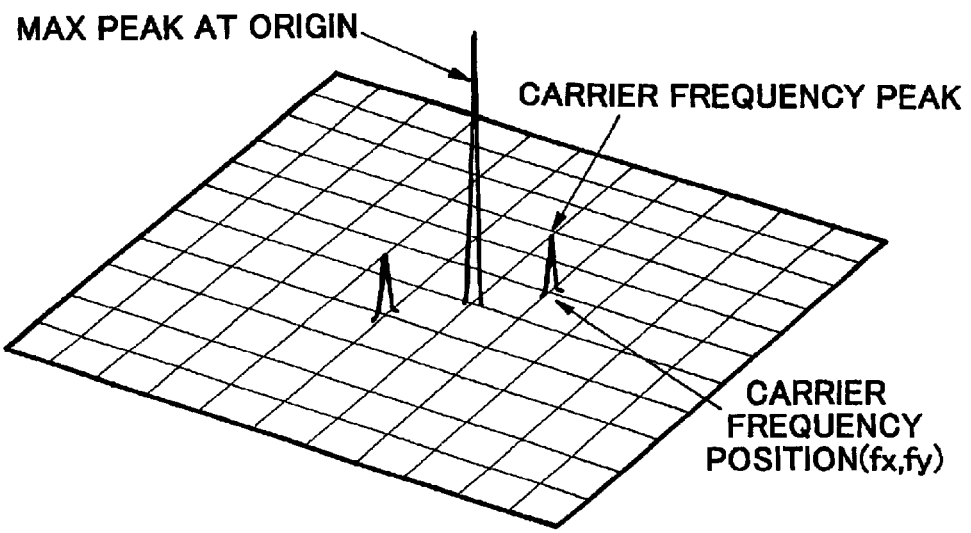
FIG. 8 is a view showing a frequency coordinate system employed in the method shown in FIG. 1.

Subsequently, with respect to thus determined $C(\eta-f_x, \zeta-f_y)$, a spectrum peak located at coordinates ($f_x$, $f_y$) is moved to the origin of the frequency coordinate system (see FIG. 8), and is subjected to inverse Fourier transform (S4) after eliminating the carrier frequency (including the part of the error in inclination). Then, a complex amplitude $c(x, y)$ is obtained, and the relative displacement amount between the reference surface and the object surface is determined (S5). This relative displacement amount does not include the part generated by the error in inclination of the phase shift device. Namely, the relative displacement amount represents the pure displacement amount of the phase shift device toward the optical axis.

Subsequently, without carrying out processing for moving the spectrum peak located at coordinates ($f_x$, $f_y$) to the origin of the frequency coordinate system, the above-mentioned $C(\eta-f_x, \zeta-f_y)$ is subjected to inverse Fourier transform in a state where the carrier frequency (including the part of the error in inclination of the phase shift device) is not eliminated, so as to determine the relative tilt amount between the reference surface and the object surface (S6). Thus determined relative tilt amount includes a predetermined inclination imparted to the phase shift device in order to introduce the spatial carrier frequency, and the part of the error in inclination of the phase shift device generated upon driving the phase shift device.

From thus determined relative displacement amount and relative tilt amount between the reference surface and the object surface, each phase shift position (phase shift amount) of the phase shift device including the phase displacement amount concerning the part of the error in inclination of the phase shift device can be determined (S7). Then, thus determined plurality of (at least three) phase shift positions (phase shift amounts) are inputted into a predetermined computing equation which will be explained later, so as to determine a wrapped phase of the object (S8). Thereafter, the unwrapped phase of the object is determined by a known unwrapping process (S9).

Step of Specifying Positional Data of Each Phase Position

This step corresponds to the processing of S1 to S5 in the flowchart of FIG. 1.

In general, the Fourier transform fringe analysis method can determine a phase from a single fringe image alone by introducing a carrier frequency (relative inclination between the object surface and the reference surface). When the carrier frequency is introduced, the interference fringe intensity is represented by the following expression (9):

$$i(x, y) = a(x, y) + b(x, y)\cos[2\pi f_x x + 2\pi f_y y + \phi(x, y) + \xi] \quad (9)$$

where a(x, y) is the background of interference fringes;
b(x, y) is the visibility of fringes;
$\phi$ (x, y) is the phase of the object;
$\xi$ is the initial phase of the object; and
$f_x$ and $f_y$ are carrier frequencies.

As mentioned above, $\xi$ is expressed by $\xi = 2\pi z/\lambda$, where $\lambda$ is the wavelength of light, and z is the displace amount of the phase shift device (not including the part involved with the inclination of the phase shift device). Therefore, the above-mentioned expression (9) can be deformed as the following expression (10):

$$i(x, y) = a(x, y) + c(x, y)\exp[i(2\pi f_x + 2\pi f_y)] + c^*(x, y)\exp[-i(2\pi f_x + 2\pi f_y)] \quad (10)$$

where $c(x, y)$ is the complex amplitude of interference fringes, and $c^*(x, y)$ is the complex conjugate of $c(x, y)$:

$$c(x, y) = \frac{b(x, y)\exp[i\phi(x, y) + \xi]}{2}. \quad (11)$$

When the above-mentioned expression (10) is subjected to Fourier transform, the following expression (12) can be obtained:

$$I(\eta,\zeta) = A(\eta,\zeta) + C(\eta-f_x,\zeta-f_y) + C^*(\eta+f_x,\zeta+f_y) \quad (12)$$

where $A(\eta, \zeta)$ is the Fourier transform of a(x, y);
$C(\eta-f_x, \zeta-f_y)$ is the Fourier transform of $c(x,y)\exp[i(2\pi f_x + 2\pi f_y)]$; and
$C^*(\eta+f_x, \zeta+f_y)$ is the Fourier transform of $c^*(x, y)\exp[(-i(2\pi f_x + 2\pi f_y)]$.

As in the procedure carried out in a typical Fourier transform method, $C(\eta-f_x, \zeta-f_y)$ is determined by filtering. After a spectrum peak located at coordinates ($f_x$, $f_y$) is moved to the origin of the frequency coordinate system so as to eliminate the carrier frequency (including the part of the error in inclination of the phase shift device), $C(\eta-f_x, \zeta-f_y)$ is subjected to inverse Fourier transform (S4), whereby c(x, y) is obtained. Here, assuming that $\xi_0$ is the initial phase of the phase shift device, and $\xi_1$ is the phase after the movement, the following expression (13):

$$c_0(x, y) = \frac{b(x, y)\exp\{i[\phi(x, y) + \xi_0]\}}{2} \quad (13)$$

is obtained from the interference fringe image data at the start position.

Then, from the interference fringe image data after moving the phase shift device, the following expression (14):

$$c_1(x, y) = \frac{b(x, y)\exp\{i[\phi(x, y) + \xi_1]\}}{2} \quad (14)$$

is obtained.

As a consequence, the following expression (15):

$$\frac{c_1(x, y)}{c_0(x, y)} = \frac{\exp\{i[\phi(x, y) + \xi_1]\}}{\exp\{i[\phi(x, y) + \xi_0]\}} = \exp[i(\xi_1 - \xi_0)] \quad (15)$$

is obtained.

Therefore, the phase difference between before and after moving the phase shift device is represented by the following expression (16):

$$\xi = \xi_1 - \xi_0 \quad (16)$$

-continued $$= \tan^{-1} \frac{\operatorname{Im}\left[\frac{c_1(x, y)}{c_0(x, y)}\right]}{\operatorname{Re}\left[\frac{c_1(x, y)}{c_0(x, y)}\right]}$$

Therefore, the displacement amount of the phase shift device is represented by the following expression (17):

$$z = z_1 - z_0 \qquad (17)$$

$$= \frac{2\pi}{\lambda} \cdot \tan^{-1} \frac{\operatorname{Im}\left[\frac{c_1(x, y)}{c_0(x, y)}\right]}{\operatorname{Re}\left[\frac{c_1(x, y)}{c_0(x, y)}\right]}$$

When the respective displacement amounts determined for individual interference fringe images obtained by a predetermined phase shift are averaged, displacement can be detected at a high accuracy. When detected the displacement of the object by the Fourier transform fringe analysis method, it is not always necessary to use the whole fringe image data. Displacement can also be detected with a sufficiently high accuracy from a part of fringe image data alone.

Step of Calculating Object Phase

In the following, a technique for determining the phase of the object according to individual phase position data of the phase shift device obtained as mentioned above will be explained.

In summary, this technique is carried out such that, as shown in the flowchart of FIG. 1, the above-mentioned $C(\eta-f_x, \zeta-f_y)$ is subjected to inverse Fourier transform in a state not eliminating the carrier frequency (including the part of the error in inclination of the phase shift device), so as to determine the relative tilt amount (including the part of the error in inclination of the phase shift device) between the reference surface and the object surface (S6), each phase shift position (phase shift amount) of the phase shift device including the phase displacement amount involved with the inclination of the phase shift device is determined according to the relative tilt amount and the displacement amount of the phase shift device determined as mentioned above (S7), the wrapped phase of the object is obtained according to a predetermined computing equation which will be explained later (S8), and the unwrapped phase of the object is determined by unwrapping (S9).

Though the technique for determining the phase in this embodiment can correspond to any number of buckets (3, 4, 5, 7, 11, and N buckets, etc.), only 3-bucket, 4-bucket, and 5-bucket methods will be explained here for the convenience of explanation.

In the 3-bucket phase shift method based on a given shift amount, the interference fringe intensity at the m-th shift position introducing the carrier frequency is represented by the following expression (18):

$$i_m(x, y, \xi_m) = a(x, y) + b(x, y)\cos[2\pi f_{xm}x + 2\pi f_{ym}y + \phi(x, y) + \xi_m] = a(x, y) + b(x, y)\cos[\phi(x, y) + \delta_m] \qquad (18)$$

where
a(x, y) is the background of interference fringes;
b(x, y) is the visibility of fringes;
$\phi$ (x, y) is the phase of the object; and
$\delta_m$ is the phase shift amount of the phase shift device expressed by:

$$\delta_m = 2\pi f_{xm}x + 2\pi f_{ym}y + \xi_m \qquad (18a)$$

where $\xi_m$ is the phase of the phase shift device (not including the part involved with the tilt of the phase shift device); and $f_{xm}$ and $f_{ym}$ are the carrier frequencies (including the part of the error in inclination of the phase shift device) after the m-th phase shift expressed by:

$$\xi_m = 2\pi \frac{z_m}{\lambda}, \quad f_{xm} = \frac{2 \cdot \tan\theta_{xm}}{\lambda}, \quad f_{ym} = \frac{2 \cdot \tan\theta_{ym}}{\lambda}$$

where $\lambda$ is the wavelength of light;

$\theta_{xm}$ and $\theta_{ym}$ are respective relative inclinations between the reference surface and the object surface upon the m-th phase shift (including the part of the error in inclination of the phase shift device) in X and Y directions; and $z_m$ is the amount of displacement of the phase shift device at the m-th shift position (not including the part involved with the tilt of the phase shift device).

The phase shift amount $\delta_m$ of the phase shift device in the above-mentioned expression (18) represents the relative phase difference between the reference surface and the object surface including the phase displacement amount involved with the pure displacement of the phase shift device toward the optical axis and the phase displacement amount involved with the inclination of the phase shift device, and is determined by the following procedure.

First, the above-mentioned $C(\eta-f_x, \zeta-f_y)$ is subjected to inverse Fourier transform (S6) in a state not eliminating the carrier frequency (including the part of the error in inclination of the phase shift device), so as to determine the form of the object surface in a state where the relative tilt amount (including the part of the error in inclination of the phase shift device) between the reference surface and the object surface is superposed thereon. Subsequently, the method of least squares is used for determining a plane fitting the above-mentioned surface form, and the above-mentioned relative tilt amounts $\theta_{xm}$ and $\theta_{ym}$ are determined according to the differential coefficient of the least-square plane.

Thereafter, the relative tilt amounts $\theta_{xm}$ and $\theta_{ym}$ are inputted into their corresponding expressions mentioned above in connection with expression (18), so as to determine the carrier frequency ($f_{xm}$, $f_{ym}$) (including the part of the error in inclination of the phase shift device), whereas the displacement amount $z_m$ of the phase shift device determined by the procedure mentioned above is inputted into its corresponding expression set forth in connection with the above-mentioned expression (18) so as to determine the phase $\xi_m$ of the phase shift device (not including the part involved with the inclination of the phase shift device). Further, thus determined carrier frequency ($f_{xm}$, $f_{ym}$) and phase $\xi_m$ of the phase shift device are inputted into the above-mentioned expression (18a), so as to determine the phase shift amount $\delta_m$ of the phase shift device.

For determining the phase $\phi(x, y)$ of the object, the following expression (19):

$$p = \frac{i_3 - i_2}{i_2 - i_1} = \frac{\cos[\phi(x, y) + \delta_3] - \cos[\phi(x, y) + \delta_2]}{\cos[\phi(x, y) + \delta_2] - \cos[\phi(x, y) + \delta_1]} \qquad (19)$$

will now be studied.

From this expression, the following expression (20):

$$\phi(x, y) = \arctan\frac{\cos\delta_3 - (1 + p)\cos\delta_2 + p\cos\delta_1}{\sin\delta_3 - (1 + p)\sin\delta_2 + p\sin\delta_1} \quad (20)$$

is obtained.

The above-mentioned procedure can determine the phase shift amount $\delta_m$ representing the relative phase difference between the reference surface and the object surface. Therefore, the wrapped phase of the object form can be determined by using the above-mentioned expression (20). Further, a known unwrapping method can be used for determining a continuous object phase $\Phi$.

In the 4-bucket phase shift method with a given shift amount, the following expressions (21) and (22) are used in place of the above-mentioned expressions (19) and (20):

$$p = \frac{i_4 - i_2}{i_3 - i_1} = \frac{\cos[\phi(x, y) + \delta_4] - \cos[\phi(x, y) + \delta_2]}{\cos[\phi(x, y) + \delta_3] - \cos[\phi(x, y) + \delta_1]}. \quad (21)$$

$$\phi(x, y) = \arctan\frac{\cos\delta_4 - \cos\delta_2 + p\cos\delta_3 - p\cos\delta_1}{\sin\delta_4 - \sin\delta_2 + p\sin\delta_3 - p\sin\delta_1}. \quad (22)$$

In the 5-bucket phase shift method with a given shift amount, the following expressions (23) and (24) are used in place of the above-mentioned expressions (19) and (20):

$$p = \frac{2(i_4 - i_2)}{i_1 - 2i_3 + i_5} = \frac{2\{\cos[\phi(x, y) + \delta_4] - \cos[\phi(x, y) + \delta_2]\}}{\cos[\phi(x, y) + \delta_1] - 2\cos[\phi(x, y) + \delta_3] + \cos[\phi(x, y) + \delta_5]}. \quad (23)$$

$$\phi(x, y) = \arctan\frac{2\cos\delta_4 - 2\cos\delta_2 + p\cos\delta_1 - 2p\cos\delta_3 + p\cos\delta_5}{2\sin\delta_4 - 2\sin\delta_2 + p\sin\delta_1 - 2p\sin\delta_3 + p\sin\delta_5}. \quad (24)$$

Figure 2:
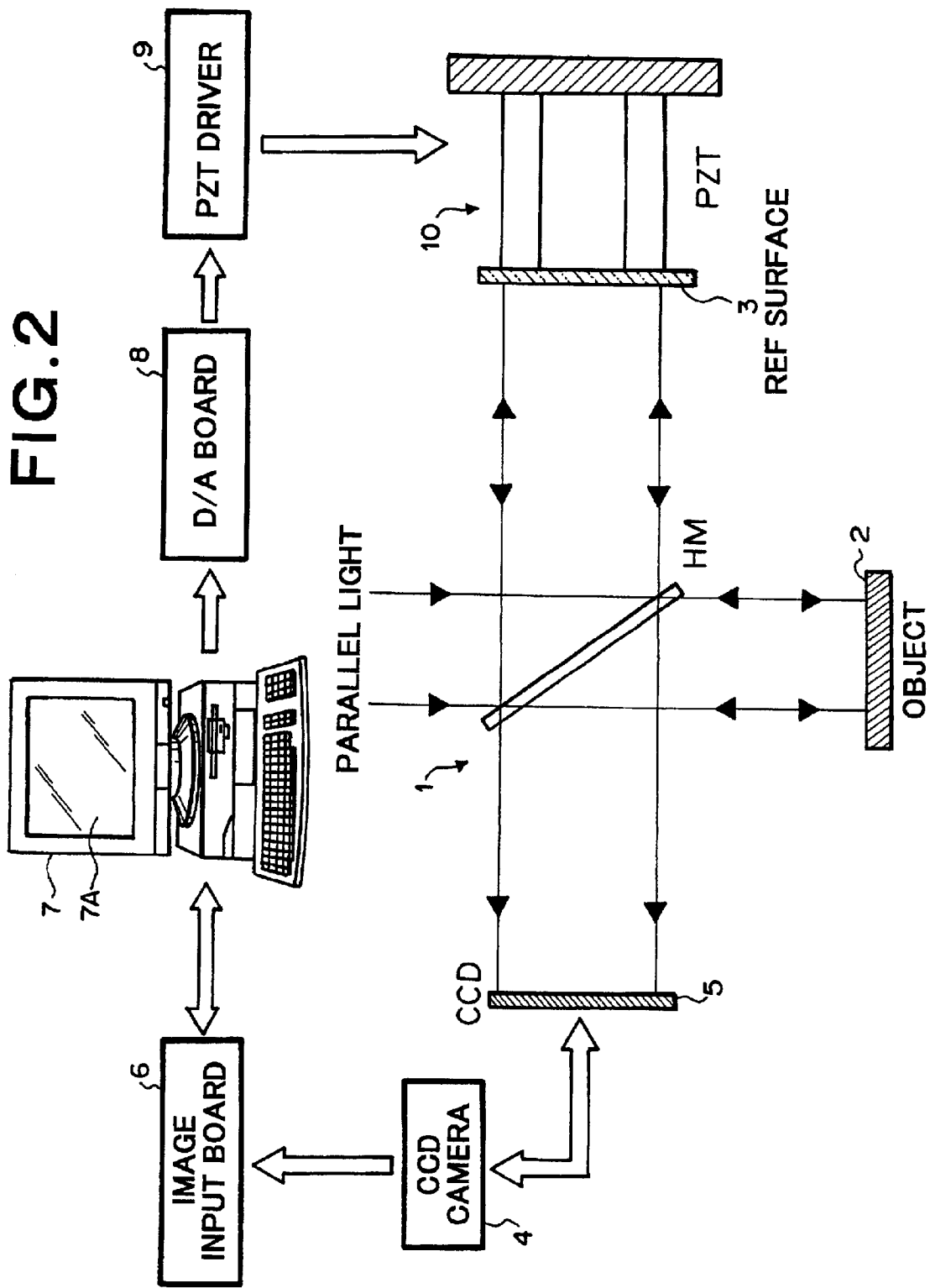
FIG. 2 is a block diagram of an apparatus for carrying out the method shown in FIG. 1.

An apparatus for carrying out the above-mentioned method will now be explained with reference to FIG. 2.

This apparatus is used for carrying out the method in accordance with the above-mentioned embodiment. As shown in FIG. 2, in a Michelson type interferometer 1, interference fringes are formed on the imaging surface of CCD 5 in an image pickup camera 4 by respective reflected luminous fluxes from an object surface 2 and a reference surface 3, and are inputted into a computer 7 equipped with a CPU and an image processing memory by way of an image input board 6. Thus inputted interference fringe image data is subjected to various arithmetic operations, and the results of operations are displayed onto a monitor screen 7A. The interference fringe image data outputted from the image pickup camera 4 is temporarily stored into the memory due to the processing carried out by the CPU. The piezoelectric driving signal outputted from the computer 7 is fed into a piezoelectric driver 9, whereas a PZT (piezoelectric device) actuator 10 is driven in response thereto.

The computer 7 subjects thus obtained interference fringe image data to Fourier transform, so as to determine the (relative) phase shift amount of the phase shift device (between the object surface and the reference surface), and an arithmetic operation of the computing equation in which the phase shift amount is inputted is carried out, so as to calculate the phase of the object surface.

Figure 5A:
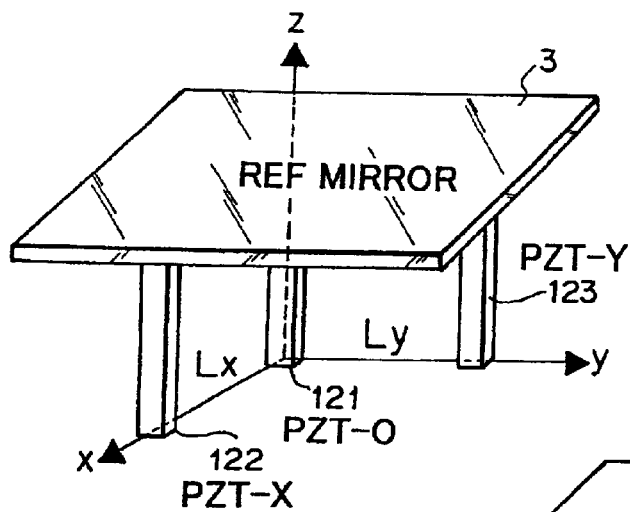
FIGS. 5A and 5B are views specifically showing a part of FIG. 2.
Figure 5B:
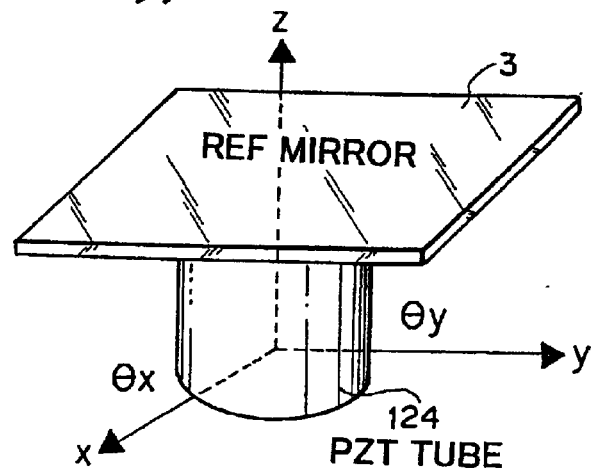

FIGS. 5A and 5B show two modes of the PZT (piezoelectric device) actuator 10, respectively.

As shown in FIG. 5A, the first mode comprises three piezoelectric elements 121, 122, 123 for supporting the backside of the reference surface (reference mirror) 3, whereas two lines $L_x$, $L_y$ respectively connecting the piezoelectric element 121, also acting as a fulcrum member, to the other piezoelectric elements 122, 123 on the reference mirror having the reference surface 3 are arranged orthogonal to each other. A phase shift is effected when the three piezoelectric elements 121, 122, 123 expand/contract by the same amount. When the piezoelectric element 122 expands/contracts alone, the reference surface 3 of the reference mirror inclines in the x-axis direction so as to rotate about the y axis. When the piezoelectric element 123 expands/contracts alone, the reference surface 3 of the reference mirror inclines in the y-axis direction so as to rotate about the x axis. As shown in FIG. 5B, the second mode is constructed such that the center part of the backside of the reference surface (reference mirror) 3 is supported by a cylindrical piezoelectric tube 124. A phase shift is effected by an unbiased expansion/contraction of the piezoelectric tube 124. On the other hand, a biased expansion/contraction freely tilts the reference surface 3 of the reference mirror in x- and y-axis directions.

Figure 6:
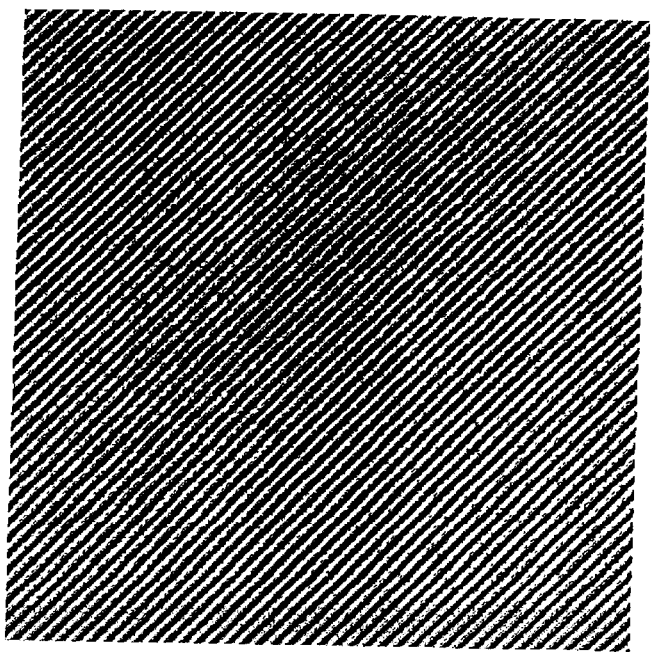
FIG. 6 is a view showing a fringe image employed for verifying the method shown in FIG. 1.
Figure 7:
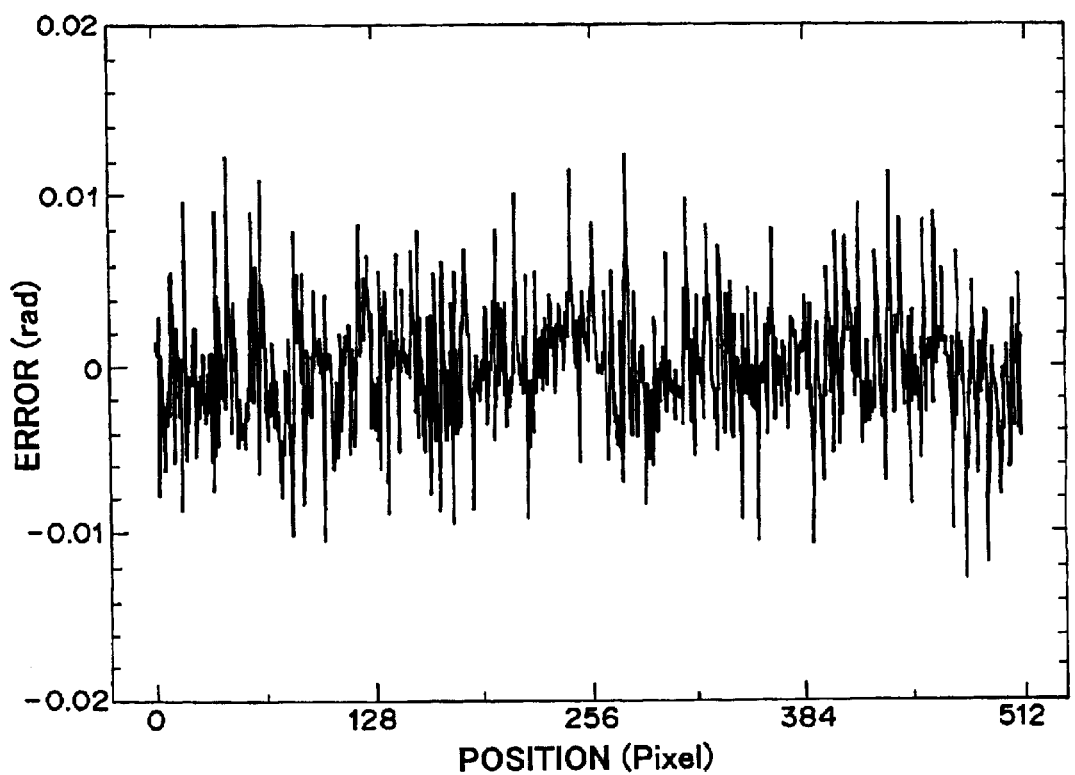
FIG. 7 is a view showing the results having verified the method shown in FIG. 1.

For verifying the accuracy of the method in accordance with the above-mentioned embodiment, a phase analysis was carried out by the above-mentioned 3-bucket method while using three fringe images whose initial phases were 0°, 76°, and 123°, respectively, in interference fringes (with 256 gradations) shown in FIG. 6 obtained when an ideal plane is observed. Thus determined phase shift amounts were 75.99860° and 122.9973°. FIG. 7 shows the error between the results of phase analysis and the ideal plane. The maximum error is about ±0.01 rad ($7.9 \times 10^{-4}$ $\lambda$), which is on a negligible order. Therefore, it has been verified that highly accurate phase analysis can be carried out by the 3-bucket method as well.

Without being restricted to the above-mentioned embodiment, the method of the present invention can be modified in various manners. When detected the inclination of the object in the method in accordance with the above-mentioned embodiment, fringe image data carrying the phase information from the object is acquired, the whole or part of each fringe image data is subsequently subjected to Fourier transform, so as to determine the phase information of the object in the fringe image data, and the inclination of the object is detected according to thus determined phase information. However, for example, the frequency of carrier fringes in the fringe image data may be determined in place of the phase information in the fringe image data, and the inclination of the object may be detected according to thus determined frequency of carrier fringes. A technique for detecting the inclination of the object by determining the frequency of carrier fringes in fringe image data as such is disclosed in detail in the specification of commonly-assigned U.S. patent application Ser. No. 10/021,014.

The phase shift element is not limited to the above-mentioned PZT, but may be those which can achieve the phase shift method by physically moving the reference surface or object surface or changing the optical path length by use of an AO element or EO element, or a transmission type element which can change the refractive index or the like so as to alter the optical path length when inserted into the reference optical path and/or observation optical path.

Though three PZT elements are exactly positioned at the respective vertices of a rectangular triangle as a mode for arranging them in the above-mentioned embodiment, the aimed effect can be obtained if the three members are arranged so as to form the respective vertices of a given triangle on the reference mirror.

Though the above-mentioned embodiment is explained while using spatial carrier frequencies as carrier frequencies, temporal carrier frequencies or temporal spatial carrier frequencies can also be used as the carrier frequencies of the present invention.

Though the interference fringe image data is captured with a Michelson type interferometer in the above-mentioned embodiment, the present invention is similarly applicable to interference fringe image data obtained by other types of interferometers such as those of Fizeau type as a matter of course.

Further, the present invention is similarly applicable to various kinds of fringe images such as moiréfringes and speckle fringes in addition to interference fringes.

In the phase shift fringe analysis method in accordance with the present invention and the apparatus using the same, a phase shift device is employed for phase-shifting an object to be observed and a reference relative to each other, fringe image data of at least three phase positions having a given gap therebetween are obtained, positional data of the at least three phase positions are specified when determining the phase of the object by analyzing thus obtained plurality of fringe image data items, and a phase analysis is carried out by subjecting the whole or part of the fringe image data on which carrier fringes at these phase positions are superposed to a predetermined arithmetic operation, so as to determine the phase of the object.

Therefore, as compared with the prior art in which a predetermined shift position is fixed as a specified value, the time required for a calculation for correcting the amount of error from the predetermined shift position becomes unnecessary. Also, the accuracy in measurement can be improved by a bucket method with a smaller number even without using expensive phase shift means, whereby the time required for fringe analysis can be shortened.

What is claimed is:

1. A phase shift fringe image analysis method comprising the steps of shifting an object to be observed and a reference relative to each other by using a phase shift device, obtaining fringe image data at a plurality of phase shift positions, and determining a phase of said object by analyzing thus obtained plurality of fringe image data items;

wherein said plurality of phase shift positions are at least three phase positions having a given phase gap therebetween; and wherein positional data of said at least three phase positions are specified, and the whole or part of said fringe image data on which carrier fringes at said phase positions are superposed is subjected to a predetermined arithmetic operation so as to carry out a phase analysis and determine said phase of said object.

2. A phase shift fringe analysis method according to claim 1, wherein said positional data of said at least three phase positions are determined by a Fourier transform fringe analysis method.

3. A phase shift fringe analysis method according to claim 1, wherein said predetermined arithmetic operation is carried out in view of data concerning relative tilt between said object and said reference at said at least three phase positions.

4. A phase shift fringe analysis method according to claim 3, wherein said data concerning relative tilt between said object and said reference is determined from a difference in frequency of said carrier fringes.

5. A phase shift fringe analysis method according to claim 3, wherein said data concerning relative tilt between said object and said reference is determined from a difference in phase of said object.

6. A phase shift fringe analysis method according to claim 1, wherein the number of phase shift positions for determining said fringe image data is 3, and wherein said phase of said object is represented by the following conditional expression (1):

$$\phi(x, y) = \arctan \frac{\cos\delta_3 - (1+p)\cos\delta_2 + p\cos\delta_1}{\sin\delta_3 - (1+p)\sin\delta_2 + p\sin\delta_1} \text{ where} \quad (1)$$

$$p = \frac{i_3 - i_2}{i_2 - i_1} = \frac{\cos[\phi(x,y) + \delta_3] - \cos[\phi(x,y) + \delta_2]}{\cos[\phi(x,y) + \delta_2] - \cos[\phi(x,y) + \delta_1]}, \text{ and}$$

$$i_m(x, y, \xi_m) = a(x, y) + b(x, y)\cos[2\pi f_{xm}x + 2\pi f_{ym}y + \phi(x, y) + \xi_m]$$

$$= a(x, y) + b(x, y)\cos[\phi(x, y) + \delta_m]$$

where a(x, y) is the background of interference fringes;

b(x, y) is the visibility of fringes;

φ(x, y) is the phase of the object; and $\delta_m$ is the phase shift amount of the phase shift device expressed by:

$$\delta_m = 2\pi f_{xm}x + 2\pi f_{ym}y + \xi_m$$

where $\xi_m$ is the phase of the phase shift device (not including the part involved with the tilt of the phase shift device); and $f_{xm}$ and $f_{ym}$ are the carrier frequencies (including the part of the error in inclination of the phase shift device) after the m-th phase shift expressed by:

$$\xi_m = 2\pi \frac{z_m}{\lambda}, \quad f_{xm} = \frac{2 \cdot \tan\theta_{xm}}{\lambda}, \quad f_{ym} = \frac{2 \cdot \tan\theta_{ym}}{\lambda}$$

where

λ is the wavelength of light;

$\theta_{xm}$ and $\theta_{ym}$ are respective inclinations of the object surface upon the m-th phase shift in x and y directions; and $z_m$ is the amount of displacement of the phase shift device at the m-th shift position (not including the part involved with the tilt of the phase shift device).

7. A phase shift fringe analysis method according to claim 1, comprising the steps of determining a complex amplitude of a fringe image by said Fourier transform fringe analysis method, and obtaining said at least three phase positions according to thus determined complex amplitude.

8. A phase shift fringe analysis method according to claim 1, comprising the steps of selecting a plurality of sets of at least three local fringe image data items corresponding to each other from fringe image data at said at least three phase shift positions, obtaining positional data of said at least three phase positions concerning each set according to said fringe image data of respective set, and averaging positional data of phase positions by a number corresponding to the number of said sets, so as to determine final positional data of said at least three phase positions.

9. A phase shift fringe analysis method according to claim 1, wherein said fringe image is an interference fringe image.

10. A phase shift fringe analysis apparatus for shifting an object to be observed and a reference relative to each other by using a phase shift device, obtaining fringe image data at a plurality of phase shift positions, and analyzing thus obtained plurality of fringe image data items so as to determine a phase of said object;

wherein said plurality of phase shift positions are at least three phase positions having a given phase gap therebetween; and wherein said apparatus comprises data acquiring means for obtaining positional data of said at least three phase positions, and phase analysis means for carrying out a phase analysis by subjecting the whole or part of said fringe image data on which carrier fringes at said phase positions are superposed to a predetermined arithmetic operation.

* * * * *